(12) United States Patent
Chen (10) Patent No.: US 10,572,100 B2
(45) Date of Patent: Feb. 25, 2020

(54) SYSTEM, METHOD, AND APPARATUS FOR WEBPAGE PROCESSING

(71) Applicant: ALIBABA GROUP HOLDING LIMITED, George Town, Grand Cayman (KY)

(72) Inventor: Lei Chen, Hangzhou (CN)

(73) Assignee: ALIBABA GROUP HOLDING LIMITED, Grandy Cayman (KY)

( * ) Notice: Subject to any disclaimer, the term of this patent is extended or adjusted under 35 U.S.C. 154(b) by 0 days.

(21) Appl. No.: 15/273,526

(22) Filed: Sep. 22, 2016

(65) Prior Publication Data

US 2017/0083482 A1    Mar. 23, 2017

(30) Foreign Application Priority Data

Sep. 23, 2015   (CN) .......................... 2015 1 0615414

(51) Int. Cl.
*G06F 17/20* (2006.01)
*G06F 3/0481* (2013.01)
*H04L 29/08* (2006.01)

(52) U.S. Cl.
CPC .......... *G06F 3/04812* (2013.01); *H04L 67/02* (2013.01)

(58) Field of Classification Search
CPC .................................................. G06F 3/04812
See application file for complete search history.

(56) References Cited

U.S. PATENT DOCUMENTS

| 9,432,471 B1 | 8/2016 | Boshy et al. | |
| 2002/0075332 A1* | 6/2002 | Geilfuss, Jr. | G06Q 30/02 715/859 |
| 2002/0103778 A1* | 8/2002 | Saxena | G06F 16/9574 |
| 2003/0226104 A1* | 12/2003 | Blazejewski | G06F 17/30696 715/206 |
| 2005/0257400 A1* | 11/2005 | Sommerer | G06F 17/30873 36/13 |
| 2006/0004910 A1* | 1/2006 | Burd | G06F 16/972 709/203 |

(Continued)

FOREIGN PATENT DOCUMENTS

| CN | 105653603 A | 6/2016 |
| CN | 105653612 A | 6/2016 |

(Continued)

OTHER PUBLICATIONS

International Search Report and Written Opinion dated Dec. 20, 2016, issued in corresponding International Application No. PCT/US16/53579 (9 pages).

(Continued)

*Primary Examiner* — Shahid K Khan
(74) *Attorney, Agent, or Firm* — Finnegan, Henderson, Farabow, Garrett & Dunner, LLP (57) ABSTRACT

A webpage processing method is disclosed. The method may be implemented by a computer system. The method may comprise capturing positional information of an indication identifier on a source page if a request triggered on the source page requires return data, receiving the return data, determining a target event on a target page of the return data, configuring a display position of the target event on the target page according to the captured positional information, and displaying the target event at the configured display position.

21 Claims, 4 Drawing Sheets

(56) References Cited

U.S. PATENT DOCUMENTS

| | | | |
|---|---|---|---|
| 2007/0061695 A1* | 3/2007 | Sanabria | G06F 8/10 715/273 |
| 2008/0010683 A1 | 1/2008 | Baddour et al. | |
| 2009/0121471 A1 | 5/2009 | Gaffney et al. | |
| 2010/0083146 A1* | 4/2010 | Hasuike | G06T 11/40 715/760 |
| 2012/0010995 A1 | 1/2012 | Skirpa et al. | |
| 2014/0006147 A1* | 1/2014 | Pisaris-Henderson | G06Q 30/02 705/14.49 |
| 2015/0074516 A1 | 3/2015 | Ben-Aharon et al. | |
| 2016/0239864 A1 | 8/2016 | Qi et al. | |
| 2016/0246481 A1 | 8/2016 | Dakua et al. | |
| 2016/0283480 A1 | 9/2016 | Zhuang et al. | |
| 2016/0328118 A1* | 11/2016 | Yoshikawa | G08G 3/02 |

FOREIGN PATENT DOCUMENTS

| | | |
|---|---|---|
| CN | 105677672 A | 6/2016 |
| CN | 105677678 A | 6/2016 |
| EP | 2 833 273 A1 | 2/2015 |
| WO | WO 2016/082698 A1 | 6/2016 |
| WO | WO 2016/157373 A1 | 10/2016 |
| WO | WO 2016/164036 A1 | 10/2016 |

OTHER PUBLICATIONS

Extended European Search Report pursuant to Rule 62 EPC, the Supplementary European Search Report (Art. 153(7) EPC) and the European Search Opinion issued in EPO Application No. 16849811. 1-1217 dated May 6, 2018 (8 pgs.).

\* cited by examiner

FIG. 4

SYSTEM, METHOD, AND APPARATUS FOR WEBPAGE PROCESSING

CROSS REFERENCE TO RELATED APPLICATION

The present application is based on and claims the benefits of priority to Chinese Application No. 201510615414.X, filed Sep. 23, 2015, the entire contents of which are incorporated herein by reference.

TECHNICAL FIELD

The present application relates to methods, apparatus, and systems for webpage processing.

BACKGROUND

In the Internet age, people frequently receive information and conduct business activities including, for example, online shopping, financial transactions, and email messaging, using webpages.

When a user interacts with a webpage to perform a process, the process generally involves a long link operation. That is, multiple clicks, and even webpage redirects, may be required for such interaction through the webpages. In the long link operation, although different users may interact differently with the webpage, more than 95% of the operation paths are the same. For example, when an email is sent through a webpage mailbox, the associated operations may be described as: a user clicks "Create an email"→the page is redirected to an email editing page→the user clicks "Send"→the page is redirected and a prompt indicates that the email has been sent successfully→the user clicks "Return to the inbox" to continue browsing the mails.

In the process described above, the user can send a new mail and return to the inbox only after a series of click operations and after searching for the location of those links. For example, in the webpage that appears after the user clicks "Send" and the page is redirected, the two buttons that the user is most likely to click, e.g., "Return to the inbox" and "Send a new email," are likely provided at inconspicuous positions on the webpage, not near a current position of the user's mouse. Therefore, if a user wishes to return to the Inbox after sending an email, the user may need to search for a position of the button, move the mouse to the position, and then click the button to return to the inbox. This processes causes unnecessary time delay before the user can return to the inbox.

To reduce such time delay and improve efficiency in web browsing and conducting business through webpages, a better webpage processing method and apparatus is needed.

SUMMARY

One aspect of the present disclosure is directed to a webpage processing method. The method may be implemented by a computer system. The method may comprise capturing positional information of an indication identifier on a source page if a request triggered on the source page requires return data, receiving the return data, determining a target event on a target page of the return data, configuring a display position of the target event on the target page according to the captured positional information, and displaying the target event at the configured display position.

Another aspect of the present disclosure is directed to a device for webpage processing. The device may comprise a capturing module that captures positional information of an indication identifier on a source page if a request triggered on the source page requires return data, a receiving module that receives the return data, a rendering module that determines a target event on a target page of the return data and configures a display position of the target event on the target page according to the captured positional information, and a displaying module that displays the target event at the configured display position.

Another aspect of the present disclosure is directed to a non-transitory computer-readable medium storing one or more programs, the one or more programs comprising instructions which, when executed by a processor of a computer system, cause the computer system to perform a webpage processing method. The method may comprise capturing positional information of an indication identifier on a source page if a request triggered on the source page requires return data, receiving the return data, determining a target event on a target page of the return data, configuring a display position of the target event on the target page according to the captured positional information, and displaying the target event at the configured display position.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
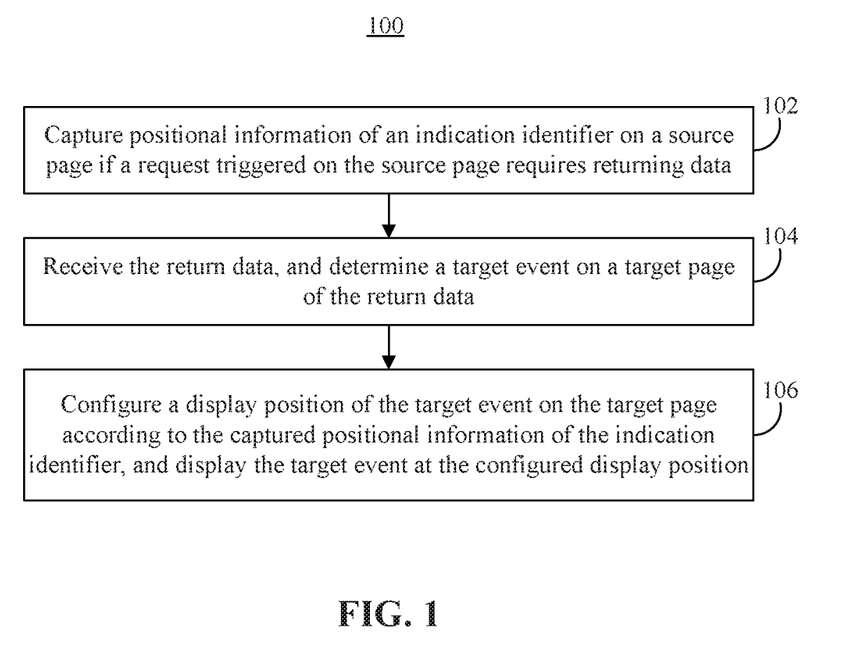
FIG. 1 is a flow diagram illustrating a method for webpage processing, consistent with an exemplary embodiment.

FIG. 1 is a flow diagram illustrating a method 100 for webpage processing, consistent with an exemplary embodiment. Method 100 may be performed by a computer system. The computer system may comprise a processor and a non-transitory computer-readable storage medium storing instructions that, when executed by the processor, perform the steps described below. Method 100 may include the following steps:

Step 102: Capture the positional information of an indication identifier on a source page if a request triggered on the source page requires return data.

In one embodiment, the indication identifier may be an identifier corresponding to a user operation on the page conducted using, for example, an external identifier device such as a mouse, a touch-sensitive stylus, a user's finger, or the like.

When operating on the page, a user may trigger the sending of a request by clicking to send a message to a server and to acquire corresponding return data. For example, when an email is sent on the page, the sending of the email may be triggered by a user's clicking action. Whether the email is sent successful may be determined through the return data. Also, subsequent operations may be executed. As another example, while online shopping, the completion of an order may be triggered by a clicking operation, and the payment information may be displayed according to the return data.

After triggering the request, the common subsequent operations conducted by users tend to have similar characteristics. For example, users may click "return to an inbox" after receiving notice that an email has been sent successfully. As another example, users may populate payment information immediately after submitting an order by clicking. That is, on a page corresponding to the return data, users may execute operations containing a similar or common characteristic such as, for example, clicking the same button with a mouse. To allow the user avoid the time delay and inefficiency associated with having to move the indication identifier (e.g., the cursor of the mouse) before performing a subsequent operation, a position of the indication identifier may be recorded in advance. That is, when the request is triggered, the positional information of the indication identifier on the page, such as the coordinate information of the indication identifier on the source page, may be automatically captured by the source page. Accordingly, to save time and improve efficiency, information regarding the subsequent operation may be displayed at the captured position where the indication identifier is located, so that a user may execute the subsequent operation without having to first locate and move the indication identifier.

Step 104: Receive the return data, and determine a target event on a target page of the return data.

The server may process the request, and generate and return the return data. After receiving the return data, a browser may render and generate a target page according to the return data. The target page may be obtained by refreshing the source page, or by a redirect.

In some embodiments, a target event on the target page may need to be determined to render the page. The target event may be an operation event on the target page triggered by the indication identifier, such as an event corresponding to the action "return to the inbox" or a payment information editing action. The target page may include more than one operation events that may be triggered by the indication identifier. To determine a target event that is an operation event commonly performed by users, statistics may be used. A predetermined or recommended operation event on the target page may also be used as the target event.

Step 106: Configure a display position of the target event on the target page according to the captured positional information of the indication identifier, and display the target event at the configured display position. For example, the configured display position may be a position of the indication identifier.

During the rendering of the target page, the display position of the target event on the target page may be configured according to the positional information of the indication identifier. That is, a display position corresponding to the positional information of the indication identifier maybe determined on the target page to display the target event. Since the indication identifier would hover over the display position, the target event may be triggered without having to first move the indication identifier. As a result, the user can save time.

In view of the above, when a request triggered on a source page requires return data, positional information of an indication identifier on the source page may be captured. The return data may be received. A target event on a target page of the return data may be determined. A display position of the target event on the target page may be configured according to the positional information of the indication identifier, and the target event may be displayed at a position of the indication identifier. That is, the positional information of the indication identifier may be recorded when the request is sent, and the target event may be displayed at the position of the indication identifier when the target page, which is requested to be returned, is displayed. Thus, the target event may be quickly triggered, and operation time may be saved.

Figure 2:
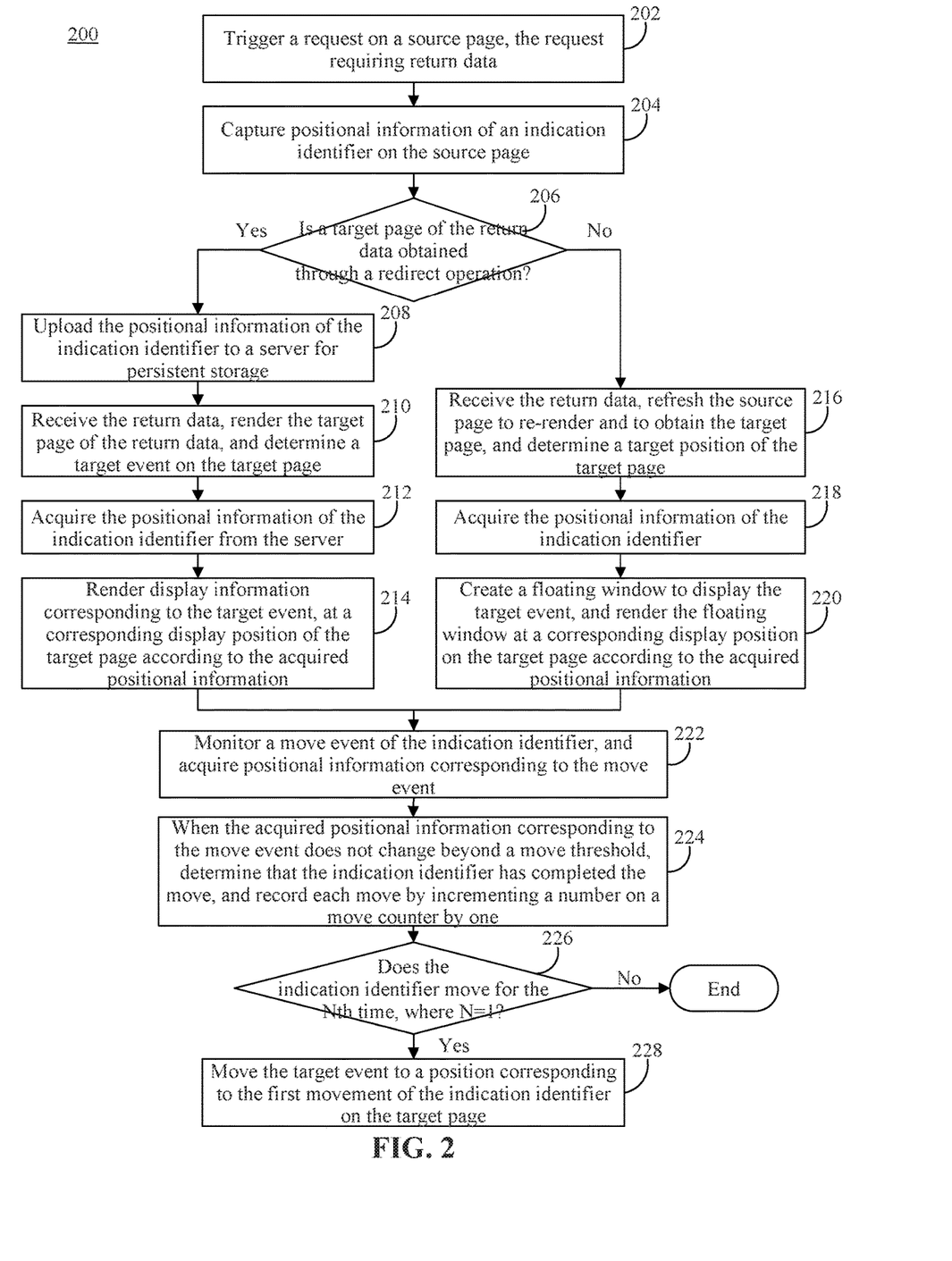
FIG. 2 is a flow diagram illustrating a method for webpage processing, consistent with an exemplary embodiment.

FIG. 2 is a flow diagram illustrating a method 200 for webpage processing, consistent with an exemplary embodiment. Method 200 may be based on method 100 described above. Method 200 may be performed by a computer system. The computer system may comprise a processor and a non-transitory computer-readable storage medium storing instructions that, when executed by the processor, perform the steps described below. Method 200 may include the following steps:

Step 202: Trigger a request on a source page, the request requiring return data.

Step 204: Capture positional information of an indication identifier on the source page.

In one embodiment, the description of method 200 uses a mouse cursor as an exemplary indication identifier.

A source page, which may be a page that a user is currently operating on, receives the request triggered by the user. The request trigger may include, for example, the clicking of a button for function selection using a mouse, and the request may require return data from a server. As another example, the request trigger may be a confirmation of the user required on a target page corresponding to the return data of the request. Accordingly, the source page may send the request to the server to acquire the return data. During this process, the source page may capture positional information, e.g., a position of the mouse cursor on the source page.

In some embodiments, the source page may acquire, by using an original JavaScript, coordinate information of the mouse cursor on the page. For example, the upper left corner of the page may be used as an origin for purposes of determining coordinates of the mouse cursor, and the captured coordinate information may be used as the positional information of the mouser cursor.

Step 206: Determine whether a target page of the return data is obtained through a redirect operation.

When the target page is a page containing requested return data, the target page may be obtained through a redirect operation optional, or through a refresh operation from the source page. Because different display methods may be processed and used depending on how the target page was obtained, how the target page was obtained, e.g., through a redirect operation or a refresh operation, may be determined in advance.

If the target page of the return data is obtained through a redirect operation, step 208 may be performed. If the target page of the return data is not obtained through a redirect operation, step 216 may be performed.

Step 208: Upload the positional information of the indication identifier to the server for persistent storage.

Before the page is redirected to the target page, the positional information of the mouse cursor may be captured. The captured positional information may be stored in a client cache or uploaded to the server for storage. The example provided in connection with this exemplary embodiment involves the use of positional information of a mouse cursor uploaded to the server and the server's performance of remote persistent storage on the positional information.

Step 210: Receive the return data, render the target page of the return data, and determine a target event on the target page.

Step 212: Acquire the positional information of the indication identifier from the server.

Step 214: Render display information corresponding to the target event at a corresponding display position of the target page according to the acquired positional information.

The server may generate the return data according to the request, and the return data may include data of a page corresponding to the request. For example, the return data may include the page address of a redirect operation page. The page address of the target page may be determined according to the return data, and the page data corresponding to the page address may be requested and rendered.

During page rendering, the acquired position of the mouse cursor may be used to determine a display position on the page of an event corresponding to a subsequent operation (e.g., a confirmation). That is, in the process of rendering, a target event of the target page may be determined, where the target event may correspond to information that needs to be confirmed by the user, or to information recommended to the user, etc. Then, the stored positional information of the mouse cursor may be acquired from the server and a display position of the target event on the target page may be determined accordingly. That is, the target event may be displayed on the target page at the position corresponding to the mouse cursor such that after the user performs a clicking action to trigger the request in the previous source page, the target event that requires the confirmation of the user may be directly displayed at the position of the mouse cursor. This makes it convenient for the user to perform a further clicking action to, for example, confirm information.

In some embodiments, a target event may be displayed directly at a display position corresponding to the positional information of the mouse cursor on the page during page rendering. In other embodiments, the target event may be displayed independently. For example, the target event may be displayed in a floating window. Accordingly, in one embodiment, rendering the display information corresponding to the target event at the display position corresponding to the target page according to the positional information of the mouse cursor may include: creating a floating window to display the display information of the target event, and rendering the floating window at a display position corresponding to the positional information of the mouse cursor on the target page.

After the positional information of the mouse is acquired and the target event is determined in the process of page rendering, a floating window may be created. The floating window may be an independent window on a webpage to display page content, and in one embodiment, the page content may relate to the webpage of the floating window. That is, the display information corresponding to the target event may be loaded to the floating window to display the display information of the target event in the floating window. In the example of sending an email, the display content of the target event may be a button or a link corresponding to "return to the inbox." In another example of a shopping webpage, the display content of the target event may include the option to input or edit payment information, e.g., an input window for inputting payment information such as a bank card number and a password. Then, the floating window may be rendered at the display position on the target page corresponding to the positional information of the mouse cursor. That is, the position on the target page corresponding to the coordinate information of the mouse cursor may be the display position, and then the coordinate information of the floating window may be correspondingly displayed at the display position. Accordingly, the mouse cursor may appear directly at the floating window, making it convenient for the user to perform a trigger operation such as providing additional input or performing a clicking action.

Step 216: Receive the return data, refresh the source page to re-render and to obtain the target page, and determine a target position of the target page.

Step 218: Acquire the positional information of the indication identifier.

Step 220: Create a floating window to display the target event, and render the floating window at a corresponding display position on the target page according to the acquired positional information of the indication identifier.

The server may generate the return data according to the request, and the return data may be data of a page corresponding to the request. For example, the return data may alert that a page refresh is needed. The return data may be used to determine that the subsequent operation is refreshing the source page to re-render and to obtain the target page. Accordingly, the server may be requested again for page data corresponding to the page address of the source page, and rendering may be performed. Before the page redirects to the target page, the positional information of the mouse cursor may be captured and stored in a client cache. Further, the positional information of the mouse cursor may be recorded in real time before the request to refresh the page is sent, and the positional information in the cache may be updated.

Similar to the rendering of the redirect page, the recorded position of the mouse cursor may be used to determine a display position of an event corresponding to the subsequent operation, such as a reconfirmation, during the page rendering. That is, during the rendering, a target event of the target page may be determined, and the target event may correspond to information that needs to be reconfirmed by the user on the target page, to information recommended to the user on the target page, or the like.

Then, the pre-stored positional information of the mouse cursor may be acquired, a floating window may be created, and display information corresponding to the target event may be loaded to the floating window to display the display information of the target event in the floating window. Then, the floating window may be rendered at the display position on the target page corresponding to the positional information of the mouse cursor. That is, a position corresponding to the coordinate information of the mouse cursor on the target page may be the display position, and the coordinate information of the floating window may be displayed correspondingly at the display position such that the mouse cursor appears on the floating window, making it convenient for a user to perform a triggering operation such as inputting and clicking.

Step 222: Monitor a move event of the indication identifier, and acquire positional information corresponding to the move event.

Step 224: When the acquired positional information corresponding to the move event does not change beyond a move threshold, determine that the indication identifier has completed the move, and record each move by incrementing a number on a move counter by one.

In one embodiment, during page rendering, the target event which needs a reconfirmation action by the user may be displayed directly at the position where the mouse cursor is located using, for example, a floating frame. This makes it convenient for the user to perform the action. However, after the page rendering is completed and the event is displayed, the user may move the mouse for various reasons, such as an accidental or otherwise unintentional move of the mouse. Therefore, to facilitate the operation of the target event, a move event of the mouse may further be monitored, and further positional information of the mouse cursor movement may be acquired.

The movement of the mouse may include a series of moves. Therefore, positional information of the mouse cursor may be recorded continuously. In one embodiment, if the positional information does not fluctuate beyond a move threshold, it may be determined that the mouse has finished moving, and the last recorded positional information may be used as the positional information for the move. Before recording, the positional information may be compared with the positional information recorded when the request was triggered on the source page. If the two values are the same, it may indicate that the movement was insignificant and that no movement had occurred; if the two values are different, it may indicate that a movement had occurred, a counter may be used to record the movement number, and the positional information of the movement may be recorded. In one embodiment, the counter may be defaulted to 0 at the beginning, and may increment by 1 after the mouse is deemed to move once. That is, the count of the counter may indicate 1 after the first movement, and after the mouse moves again, the count of the counter may become 2.

In one embodiment, coordinate information of the mouse cursor may be acquired in real time during the move. For example, when the coordinate information does not change beyond a move threshold, e.g., 500 milliseconds, and the current coordinate position is different than the recorded coordinate information of the mouse cursor during the request triggering on the source page, it may be determined that the mouse has moved once. Accordingly, the movement counter may increment by 1 to account for the first movement, and the positional information of this movement may be recorded.

Step 226: Determine whether the indication identifier moves for the Nth time, where N=1. For example, the movement of step 226 may be a part of the move event of step 222 and step 224.

In one embodiment, to prevent the floating window from continuously following the mouse cursor and making it more difficult for the user to execute other operations on the page, only the first N mouse moves may be followed. In this example where N=1, only the first movement of the mouse is followed. In this case, whether the current movement of the mouse is a first movement may be determined based on whether the current counter value is 1.

In the case where N=1, and the indication identifier moves only one time, step 228 may be performed.

In the case where N=1, when the indication identifier moves again after the first time, it may indicate that the user does not want to operate on the target event, and therefore, the following of the floating window to the mouse cursor may end. In this case, no further operation is needed, or the floating window may be closed, etc.

Step 228: in the case where N=1 and the indication identifier has moved only once, move the target event to a position corresponding to the first movement of the indication identifier on the target page.

When the mouse moves for only one time, the movement may have been caused by an unintentional move of the mouse by the user. In this case, the user may still need to perform an operation on the target event despite the move. Therefore, in this case, the floating window may follow the movement position of the mouse cursor. That is, the floating window may be moved to a position corresponding to the new positional information after the first movement of the mouse.

Thus, for both redirect and non-redirect pages, the display information corresponding to the target event may be displayed at the position of the mouse cursor recorded previously during page rendering, making it convenient for the user to operate on the target event. Moreover, the floating window may move along with a predetermined number (e.g., N=1) of movement of the mouse cursor, allowing the user to conveniently trigger the target event even in the case of an unintentional move. In addition, because the continuously changing display locations of the floating window may be limited after certain movements of the mouse cursor, the ability of a user to perform other operations may not be affected when the user does not trigger the target event. Thus, overall user experience may be improved.

In some embodiments, an original JavaScript may be used to acquire the coordinate information of the mouse cursor when a request is triggered. When the page is redirected, the coordinate information may be recorded in a cache of the client. The location of the mouse cursor may be used as a point of focus during the page rendering. That is, the display position of the target event for, e.g., reconfirmation on the page, may be determined using the coordinate information of the mouse cursor. In the example relating to an email inbox, a user may return to the inbox by directly clicking "Return" without having to move the mouse again. As explained above, the number of moves of the mouse may be recorded, and the target event may follow the mouse cursor for only N times (e.g., N=1), and may return to a preset position thereafter. And if the user does not wish to return to the inbox and continues to move the mouse, the focus may leave the "Return" button. Accordingly, the user interaction may be greatly improved.

The location of a cursor on a floating layer of a webpage may be used as a point of focus. However, in that case, when the webpage is refreshed, the previous position of the mouse cursor may be difficult to record, and the floating layer may lose its point of focus. By comparison, consistent with certain embodiments, not only can information corresponding to the target event be displayed along with the mouse when the webpage is redirected, a solution for the subsequent loss of focus is provided to eliminate the loss of point of focus of a single-logic mouse. Accordingly, a user's experience in a long link operation may be optimized, user operations may be reduced in a target event for reconfirmation, and overall user experience is improved.

For description purposes, the method embodiments are described as a series of step combination. However, persons skilled in the art should know that the embodiments of the present disclosure are not limited to the step order described herein. Some steps may be performed in other orders or simultaneously according to the embodiments of the present disclosure. Persons skilled in the art should understand that the embodiments described in the specification may be preferred embodiments, and steps involved may not be necessarily required for the embodiments.

Figure 3:
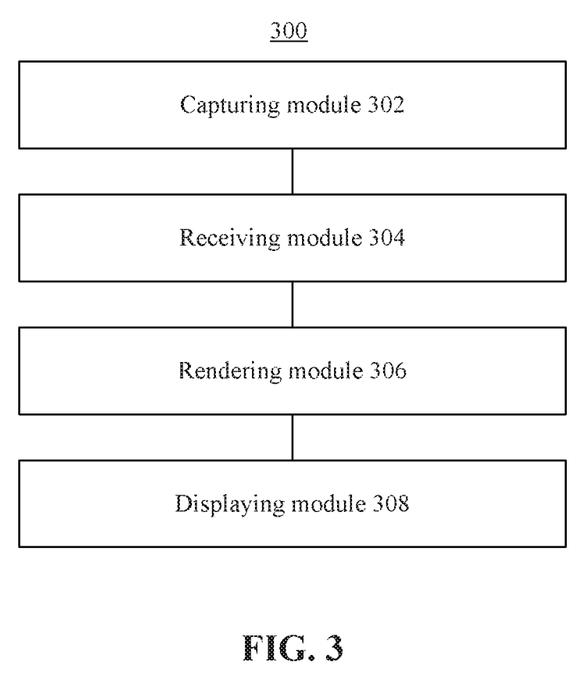
FIG. 3 is a block diagram illustrating a device for webpage processing, consistent with an exemplary embodiment.

FIG. 3 is a block diagram illustrating a device 300 for webpage processing, consistent with an exemplary embodiment. Device 300 may include the following modules:

a capturing module 302, configured to capture positional information of an indication identifier on a source page when a request triggered on the source page requires return data;

a receiving module 304, configured to receive return data;

a rendering module 306, configured to determine a target event on a target page of the return data and to configure a display position of the target event on the target page according to the positional information of the indication identifier; and a displaying module 308, configured to display the target event at a configured display position.

In view of the above, if a request triggered on a source page requires return data, positional information of an indication identifier on the source page may be captured. The return data may be received. A target event on a target page of the return data may be determined. A display position of the target event on the target page may be configured according to the positional information of the indication identifier, and the target event may be displayed at a position of the indication identifier. That is, the positional information of the indication identifier may be recorded when the request is sent, and the target event may be displayed at the position of the indication identifier when the target page, which is requested to be returned, is displayed. Thus, the target event may be quickly triggered directly, and the overall operation time may be reduced.

Figure 4:
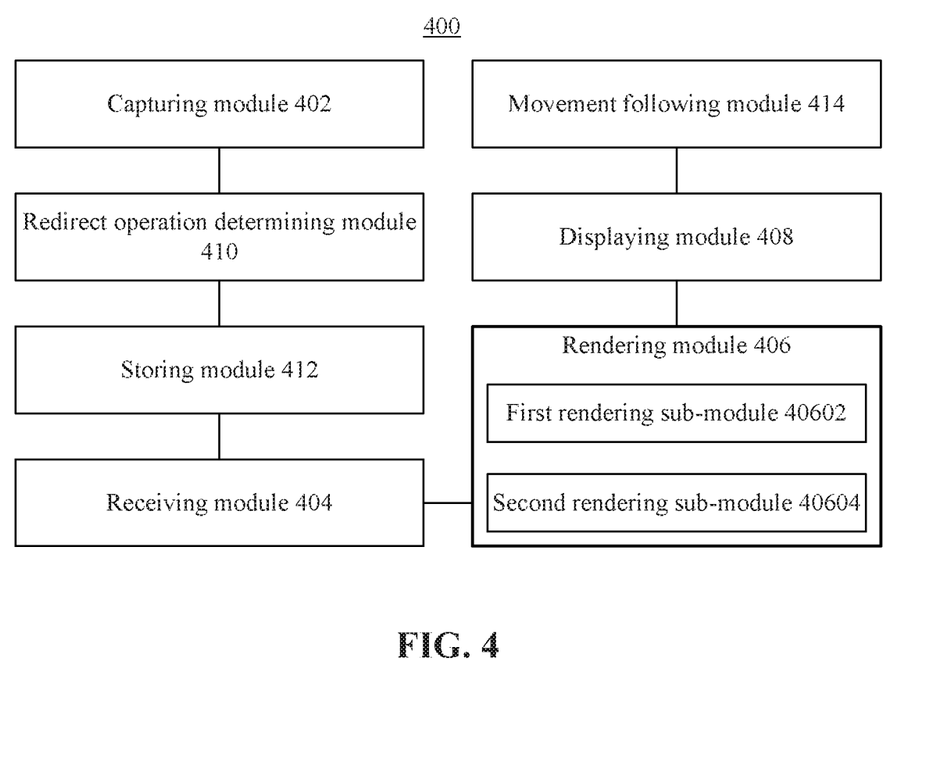
FIG. 4 is a block diagram illustrating a device for webpage processing, consistent with an exemplary embodiment.

FIG. 4 is a block diagram illustrating a device 400 for webpage processing, consistent with an exemplary embodiment. Device 400 may include the following modules:

a capturing module 402, configured to capture positional information of an indication identifier on a source page if a request triggered on the source page requires return data;

a redirect operation determining module 410, configured to determine whether the target page of the return data is obtained through a redirect operation;

a storing module 412, configured to: when the target page is obtained through a redirect operation, upload the positional information of the indication identifier to a server for persistent storage;

a receiving module 404, configured to receive return data;

a rendering module 406, configured to determine a target event on a target page of the return data and to configure a display position of the target event on the target page according to the positional information of the indication identifier;

a displaying module 408, configured to display the target event at the position of the indication identifier; and a movement following module 414, configured to: when a first movement of the indication identifier on the target page is captured, move the floating window to a position corresponding to the first movement of the indication identifier on the target page.

The rendering module 406 may include:

a first rendering sub-module 40602, configured to: when the target page is obtained through a redirect operation, acquire the positional information of the indication identifier; and when the target page is rendered, render display information corresponding to the target event at a corresponding display position of the target page according to the positional information of the indication identifier. The first rendering sub-module may be configured to create a floating window to display the display information of the target event, and render the floating window at a display position corresponding to the positional information of the indication identifier on the target page; and a second rendering sub-module 40604, configured to: when the target page is not obtained through a redirect operation, acquire the positional information of the indication identifier; when the target page is refreshed to re-render and to obtain the target page, create a floating window to display the target event; and render the floating window at the corresponding display position of the target page according to the positional information of the indication identifier.

The movement following module 414 may be further configured to monitor a move event of the indication identifier, and acquire positional information corresponding to a movement position in a moving process of the indication identifier; and when the positional information of the movement of the indication identifier does not change within a move threshold, determine that the indication identifier has finished the move, and record the number of moves by using a counter.

The indication identifier may include a mouse cursor.

Therefore, for redirect and non-redirect pages, the display information corresponding to the target event may be displayed at the position of the mouse cursor recorded previously during page rendering, making it convenient for the user to operate the target event. Moreover, the floating window may move along with the movement of the mouse cursor up to a predetermined number of moves, such that a user may still trigger the target event conveniently even in the case of an unintentional move. In addition, since the floating window may be configured to not trail the mouse cursor continuously after it is determined that the user does not intend to trigger the target event, user experience will not be compromised should the user wish to perform a different operation on the page.

In some embodiments consistent with the present disclosure, an original JavaScript may be used to acquire coordinate information of the mouse cursor when the request is triggered. When the page is redirected, the coordinate position may be recorded in a cache of the client. The mouse cursor may be used as a point of focus during the page rendering. For example, the display position of the target event for reconfirmation on the page may be determined according to the coordinate information of the mouse cursor. In an example of the mailbox, the user may be able to return to the inbox by directly clicking "Return" without having to move the mouse again. The number of moves of the mouse may be recorded, and using the recorded number of moves, the target event may move to follow the position of the mouse cursor for only a limited number of times, up to a predetermined number N (e.g., N=1). After the number of moves exceeds the predetermined number, the location of the target event may return to a preset position. If the user does not intend to operate on the target event, such as "return to the inbox," the focus may leave the "Return" button as long as the mouse moves continuously. Therefore, the user interaction may be greatly improved.

The location of a cursor on a floating layer of a webpage may be used as a point of focus. However, in that case, when the webpage is refreshed, the previous position of the mouse cursor may be difficult to record, and the floating layer may lose its point of focus. By comparison, consistent with certain embodiments, not only can information corresponding to the target event be displayed along with the mouse when the webpage is redirected, a solution for the subsequent loss of focus is provided to eliminate the loss of point of focus of a single-logic mouse. Accordingly, a user's experience in a long link operation may be optimized, user operations may be reduced in a target event for reconfirmation, and overall user experience is improved.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks may be substantially executed in parallel, and sometimes, they may also be executed in the reverse order, depending on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more computer-readable storage media (including but not limited to a magnetic disk memory, a CD-ROM, an optical memory, etc.) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, may be implemented by computer program instructions.

These computer program instructions may be provided to a processor of a computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that may direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for webpage processing. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A webpage processing method implemented by a computer system, comprising:
   capturing positional information of an indication identifier on a source page in response to a request triggered on the source page requiring returning data from a server;
   receiving the returning data from the server;
   determining a target event within a target page of the returning data;
   configuring a display position of the target event on the target page corresponding to the captured positional information; and
   displaying the target event at the configured display position.

2. The method according to claim 1, after capturing the positional information of the indication identifier on the source page, further comprising:
   determining whether the target page is obtained through a redirect operation.

3. The method according to claim 2, further comprising:
   in response to the target page being obtained through the redirect operation, uploading the captured positional information to a server for persistent storage.

4. The method according to claim 3, wherein configuring the display position of the target event on the target page according to the captured positional information comprises:
   in response to the target page being obtained through the redirect operation, acquiring the captured positional information of the indication identifier from the server; and
   rendering display information corresponding to the target event at the corresponding display position of the target page according to the acquired positional information.

5. The method according to claim 4, wherein rendering display information corresponding to the target event, at the corresponding display position of the target page according to the acquired positional information comprises:
   creating a floating window to display the display information of the target event; and
   rendering the floating window at a display position on the target page according to the acquired positional information.

6. The method according to claim 2, wherein configuring the display position of the target event on the target page according to the captured positional information comprises:
   in response to the target page being not obtained through the redirect operation, refreshing the source page to re-render and to obtain the target page;
   acquiring the captured positional information;
   creating a floating window to display the target event; and
   rendering the floating window at a corresponding display position on the target page according to the acquired positional information.

7. The method according to claim 6, further comprising:
   monitoring a move event of the indication identifier;
   acquiring positional information corresponding to the move event; and
   in response to the acquired positional information corresponding to the move event not changing beyond a move threshold, determining that the indication identifier has finished moving, and incrementing a number on a counter accordingly.

8. A device for webpage processing, comprising:
   a memory storing a set of instructions; and
   one or more processors configured to execute the set of instructions to cause the device to perform:
      capturing positional information of an indication identifier on a source page in response to a request triggered on the source page requiring returning data from a server;
      receiving the returning data from the server;
      determining a target event within a target page of the returning data and configures a display position of the target event on the target page corresponding to the captured positional information; and
      displaying the target event at the configured display position.

9. The device according to claim 8, wherein the one or more processors are further configured to execute the set of instructions to cause the device to perform:
   determining whether the target page is obtained through a redirect operation.

10. The device according to claim 9, wherein the one or more processors are further configured to execute the set of instructions to cause the device to perform:
    in response to the target page being obtained through the redirect operation, uploading the captured positional information to a server for persistent storage.

11. The device according to claim 10, wherein the one or more processors are further configured to execute the set of instructions to cause the device to perform:
    in response to the target page being obtained through the redirect operation, acquiring the captured positional information of the indication identifier from the server; and rendering display information corresponding to the target event, at the corresponding display position of the target page according to the acquired positional information.

12. The device according to claim 11, wherein acquiring the captured positional information of the indication identifier from the server further comprising:
   creating a floating window to display the display information of the target event; and
   rendering the floating window at a display position on the target page according to the acquired positional information.

13. The device according to claim 9, wherein rendering display information corresponding to the target event further comprising:
   in response to the target page being not obtained through the redirect operation, refreshing the source page to re-render and to obtain the target page;
   acquiring the captured positional information;
   creating a floating window to display the target event; and
   rendering the floating window at a corresponding display position on the target page according to the acquired positional information.

14. The device according to claim 13, wherein the one or more processors are further configured to execute the set of instructions to cause the device to perform:
   monitoring a move event of the indication identifier;
   acquiring positional information corresponding to the move event; and
   in response to the acquired positional information corresponding to the move event not changing beyond a move threshold, determining that the indication identifier has finished moving, and increments a number on a counter accordingly.

15. A non-transitory computer-readable medium storing one or more programs, the one or more programs comprising instructions which, when executed by a processor of a computer system, cause the computer system to perform a webpage processing method, comprising:
   capturing positional information of an indication identifier on a source page in response to a request triggered on the source page requiring returning data from a server;
   receiving the returning data from the server;
   determining a target event within a target page of the returning data;
   configuring a display position of the target event on the target page corresponding to the captured positional information; and
   displaying the target event at the configured display position.

16. The non-transitory computer-readable medium according to claim 15, wherein, after capturing the positional information of the indication identifier on the source page, the instructions further cause the computer system to perform:
   determining whether the target page is obtained through a redirect operation.

17. The non-transitory computer-readable medium according to claim 16, wherein the instructions further cause the computer system to perform:
   in response to the target page being obtained through the redirect operation, uploading the captured positional information to a server for persistent storage.

18. The non-transitory computer-readable medium according to claim 17, wherein configuring the display position of the target event on the target page according to the captured positional information comprises:
   in response to the target page being obtained through the redirect operation, acquiring the captured positional information of the indication identifier from the server; and
   rendering display information corresponding to the target event, at the corresponding display position of the target page according to the acquired positional information.

19. The non-transitory computer-readable medium according to claim 18, wherein rendering display information corresponding to the target event, at the corresponding display position of the target page according to the acquired positional information comprises:
   creating a floating window to display the display information of the target event; and
   rendering the floating window at a display position on the target page according to the acquired positional information.

20. The non-transitory computer-readable medium according to claim 16, wherein configuring the display position of the target event on the target page according to the captured positional information comprises:
   in response to the target page being not obtained through the redirect operation, refreshing the source page to re-render and to obtain the target page;
   acquiring the captured positional information;
   creating a floating window to display the target event; and
   rendering the floating window at a corresponding display position on the target page according to the acquired positional information.

21. The non-transitory computer-readable medium according to claim 20, wherein the instructions further cause the computer system to perform:
   monitoring a move event of the indication identifier;
   acquiring positional information corresponding to the move event; and
   in response to the acquired positional information corresponding to the move event not changing beyond a move threshold, determining that the indication identifier has finished moving, and incrementing a number on a counter accordingly.

* * * * *